United States Patent
Wang et al.

(10) Patent No.: US 8,681,708 B2
(45) Date of Patent: Mar. 25, 2014

(54) METHOD FOR ALLOCATING CONTROL CHANNELS, METHOD FOR TRANSMITTING PACKET DATA AND RNC FOR MULTI-CARRIER HSDPA

(75) Inventors: Yingmin Wang, Shanghai (CN); Shaohui Sun, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 1197 days.

(21) Appl. No.: 11/993,306

(22) PCT Filed: May 15, 2006

(86) PCT No.: PCT/CN2006/000958
§ 371 (c)(1),
(2), (4) Date: Oct. 14, 2009

(87) PCT Pub. No.: WO2006/136076
PCT Pub. Date: Dec. 28, 2006

(65) Prior Publication Data
US 2010/0034150 A1    Feb. 11, 2010

(30) Foreign Application Priority Data
Jun. 23, 2005 (CN) .......................... 2005 1 0079661

(51) Int. Cl.
*H04W 4/00* (2009.01)
*H04B 7/00* (2006.01)

(52) U.S. Cl.
USPC ........................... 370/329; 370/328; 370/310

(58) Field of Classification Search
USPC .......................................................... 370/329
See application file for complete search history.

(56) References Cited

U.S. PATENT DOCUMENTS

| | | | | |
|---|---|---|---|---|
| 7,352,722 | B2* | 4/2008 | Malladi et al. | ................ 370/335 |
| 2003/0088695 | A1 | 5/2003 | Kwak et al. | |
| 2005/0003796 | A1 | 1/2005 | Kashiwase | |

FOREIGN PATENT DOCUMENTS

| | | |
|---|---|---|
| CN | 1625089 A | 6/2005 |
| CN | 1731771 A | 2/2006 |

(Continued)

OTHER PUBLICATIONS

Japanese Office Action dated Jun. 1, 2010 for application No. 2008-517298.

(Continued)

*Primary Examiner* — Shripal Khajuria
(74) *Attorney, Agent, or Firm* — Knobbe, Martens, Olson & Bear LLP

(57) ABSTRACT

The present invention discloses a control channel allocation method, a packet data transmission method and a RNC of a multi-carrier HSDPA (high speed downlink packet access) technology, wherein the allocation method includes: when a UE accesses a network, the network allocating K pairs of uplink and downlink control channels to be monitored by the UE; during a HSDPA service transmission process, the network selecting N pairs from the K pairs of uplink and downlink control channels to transmit control messages, wherein the selected downlink channels are the corresponding uplink channels are on a same carrier; and the network allocating a pair of uplink and downlink associate channels on each carrier where the selected N pairs of uplink and downlink control channels locate, wherein M≥N≥1 and M is a number of carriers used by the network to transmit packet data. The present invention effectively solves the problem that in the traditional single carrier HSDPA, only the transmission control of the single carrier is taken into account and the control requirement in the multi-carrier HSDPA cannot be satisfied.

13 Claims, 1 Drawing Sheet

(56) References Cited

FOREIGN PATENT DOCUMENTS

| | | |
|---|---|---|
| CN | 100417294 | 9/2008 |
| GB | 2386513 A | 9/2003 |
| JP | 2001-244913 | 9/2001 |
| JP | 2003-283425 | 10/2003 |
| JP | 2003-284135 | 10/2003 |
| JP | 2003-318781 | 11/2003 |
| WO | WO 03/096598 | 11/2003 |
| WO | WO 2004019645 A1 | 3/2004 |
| WO | WO 2006/000955 | 1/2006 |

OTHER PUBLICATIONS

International Search Report for PCT/CN2006/000958 dated Sep. 7, 2006.

European Search Report, Dated Jun. 3, 2012 for Application No. 06741848.3-2412 (PCT/CN2006000958), pp. 1-12.

3$^{rd}$ Generation Partnership Project; Technical Specification Group Radio Access Network; High Speed Downlink Packet Access (HSDPA); Overall description; Stage 2 (Release 6), 2004, pp. 1-28, V6.3.0, 3GPP, France.

Indian Search Report from related Indian Application No. 57/MUMNP/2008, dated Mar. 17, 2011.

Chinese Office Action dated Jan. 16, 2009 in CN application No. 2005100796619.

Chinese Office Action dated Jun. 5, 2009 in CN application No. 2005100796619.

\* cited by examiner

METHOD FOR ALLOCATING CONTROL CHANNELS, METHOD FOR TRANSMITTING PACKET DATA AND RNC FOR MULTI-CARRIER HSDPA

FIELD OF THE INVENTION

The present invention relates to the mobile communication field and especially to a method for allocating control channels and a method for transmitting packet data of a multi-carrier HSDPA (high speed downlink packet access) technology.

BACKGROUND

A supporting ability for high speed mobile packet data services is one of the most important characteristics of the 3G system. According to WCDMA R99, a peak rate of 2 Mbps can be provided, which is adequate for most of the traditional packet services. However, for data services requiring high on traffic and delay, such as video, streaming and download, the system is required to provide a higher transmission rate and a shorter delay.

HSDPA technology is introduced in 3GPP R5, which not only supports high speed unsymmetrical data services but also can increase the network capacity while minimizing the cost of the operator. It provides a smooth evolving path for higher data rate and capacity for the UMTS (Universal Mobile Telecommunications System). The HSDPA in R5 refers to the design idea and experience of CDMA20001X EV-DO and adds a high speed data sharing channel (HS-DSCH). The HS-DSCH makes the transmission power and the PN code etc. can be fully used and can be dynamically allocated according to the practice so that the resource utilization ratio is improved.

In a transmission process of a single carrier HSDPA in R5 specification, when a UE first accesses the network, it will be allocated a pair of uplink and downlink DPCHs (dedicated physical channel) and multiple pairs of HS-SCCHs and HS-SICHs to be monitored. The pair of uplink and downlink DPCHs is called uplink and downlink associate channels. Before the network transmits packet data to the UE through the HS-DSCH, it transmits corresponding control messages to the UE through one of the HS-SCCHs, such as the channel resource occupied by and the modulation method of the packet data, so that the UE can correctly receive data transmitted through the HS-DSCH and can notify through the HS-SICH the network to retransmit data. The HS-SCCH is at the downlink and mainly for transmitting necessary control messages for the HS-DSCH decoding. The HS-SICH is at the uplink and is for transmitting necessary control messages, which are mainly about the response to the packet transmission and the feedback information of downlink quality.

The uplink and downlink associate channels are for transmitting power control information, synchronous information, high-layer signaling and data response message and also for transmitting data. In practice, the uplink and downlink associate channels are mainly for transmitting high-layer control signaling, high-layer response message and messages for initiating power control and synchronous control of the HS-SCCH and HS-SICH. The UE can obtain the transmission power and synchronous control messages adopted by the HS-SCCH through the uplink and downlink associate channels so that the UE can receive the control message of the HS-SCCH and can feed back information through the HS-SICH in time so that the transmission of packet data can be established.

In order to further improve the performance of the system, a multi-carrier HSDPA technology is proposed to enhance the transmission ability of the packet data services. However, in the R5 specification, only the single carrier HSDPA technology is adopted and the allocation of control channels (HS-SCCH, HS-SICH and uplink and downlink associate channels) for controlling packet data transmission is simple can cannot support the multi-carrier HSDPA data transmission.

SUMMARY OF THE INVENTION

An objective of the present invention is to provide a method for allocating control channels, a method for transmitting packet data and a RNC of a multi-carrier HSDPA (high speed downlink packet access) technology so as to solve the problem that in the traditional single carrier HSDPA, only the transmission control of the single carrier is taken into account and the control requirement in the multi-carrier HSDPA cannot be satisfied.

In order to achieve the above objective, a method for allocating control channels for multi-carrier is provided and includes steps of:

step A, when a UE accesses a network, the network allocating to the UE with K pairs of uplink and downlink control channels to be monitored by the UE;

step B, during a HSDPA service transmission process, the network selecting N pairs from the K pairs of uplink and downlink control channels to transmit control messages, wherein the selected each downlink channel and the corresponding uplink channel are on a same carrier; and step C, the network allocating a pair of uplink and downlink associate channels to each carrier where the selected N pairs of uplink and downlink control channels locate, wherein $M \geq N \geq 1$ and M is a number of carriers used by the network to transmit packet data.

According to the allocation method, the uplink control channel is used for the UE to transmit a channel condition on a corresponding carrier and a response message of receipt, the downlink control channel corresponding to the uplink control channel is used for transmitting a downlink control message about the HS-DSCH resources on a corresponding carrier.

According to the allocation method, in step B, the N pairs of uplink and downlink control channels correspond one-by-one to the carriers used by the network to transmit data, and each pair of uplink and downlink control channels are used for transmitting control messages of the HS-DSCH on the corresponding carrier.

According to the allocation method, in step B, the N pairs of uplink and downlink control channels are on the same carrier; while in step C, the network allocates a pair of uplink and downlink associate channels on the carrier where the N pairs of uplink and downlink control channels locate.

According to the allocation method, in step B, N is equal to 1 and in this case the pair of uplink and downlink control channels is used for transmitting control messages of the HS-DSCH on all the carriers.

According to the allocation method, in step A, the K pairs of uplink and downlink control channels are on a same carrier.

In order to achieve the above objective, a method for transmitting packet data for multi-carrier HSDPA is provided and includes steps of:

step A, when a UE accesses a network, the network allocating to the UE with K pairs of uplink and downlink control channels to be monitored by the UE;

step B, during a HSDPA service transmission process, the network selecting N pairs from the K pairs of uplink and downlink control channels to transmit control messages, wherein the selected each downlink channel and the corresponding uplink channel are on a same carrier;

step C, the network allocating a pair of uplink and downlink associate channels to each carrier where the selected N pairs of uplink and downlink control channels locate, wherein M≥N≥1 and M is a number of carriers used by the network to transmit packet data;

step D, the network transmitting a control message enabling the UE to receive packet data through the downlink control channel and the UE obtaining the control message through the downlink control channel; and step E, the network scheduling and transmitting packet data according to a response message of transmitting data and a channel quality indication of the UE fed back through the uplink control channel.

According to the packet data transmission method, between step C and step D, the UE sets an initial power for the selected uplink and downlink control channels through the information of the uplink and downlink associate channels.

According to the packet data transmission method, in step B, the N pairs of uplink and downlink control channels correspond one-by-one to the carriers used by the network to transmit data, and each pair of uplink and downlink control channels are used for transmitting control messages of the HS-DSCH on the corresponding carrier.

According to the packet data transmission method, in step B, the N pairs of uplink and downlink control channels are on a same carrier; while in step C, the network allocates a pair of uplink and downlink associate channels on the carrier where the N pairs of uplink and downlink control channels locate.

According to the packet data transmission method, in step B, N is equal to 1 and in this case the pair of uplink and downlink control channels is used for transmitting control messages of the HS-DSCH on all the carriers.

According to the packet data transmission method, in step A, the K pairs of uplink and downlink control channels are on a same carrier.

In order to achieve the above objective, a radio network controller (RNC) is provided and the RNC is used for allocating control channels for multi-carrier HSDPA, wherein the RNC includes a control channel allocation apparatus, the control channel allocation apparatus including an uplink and downlink control channel allocation unit, an uplink and downlink control channel selection unit and an uplink and downlink associate channel allocation unit, wherein the uplink and downlink control channel allocation unit is configured for allocating K pairs of uplink and downlink control channels for a UE accessed the network;

the uplink and downlink control channel selection unit is configured for selecting N pairs from the K pairs of uplink and downlink control channels to transmit control messages during a HSDPA service transmission process; and the uplink and downlink associate channel allocation unit is configured for allocating a pair of uplink and downlink associate channels on each carrier.

The present invention provides a control channel allocation method of a multi-carrier HSDPA packet data transmission according to the characteristic of the multi-carrier HSDPA transmission to effectively solve the problem that in the traditional single carrier HSDPA, only the transmission control of the single carrier is taken into account and the control requirement in the multi-carrier HSDPA cannot be satisfied.

At the same time, the present invention provides an allocation method to make multiple carriers share a same control channel so that in the data transmission process, each UE only needs to monitor one control channel. It is simple for the UE to realize.

The present invention also provides an allocation method to make each carrier correspond to one pair control channel so that it is more flexible for the network to allocate channels and is convenient for resource configuration.

In addition, according to the present invention, all the HS-SCCHs and HS-SICHs of a same UE are selected to be on a same carrier and only one pair of uplink and downlink associate channels is allocated to the same UE on the same carrier so that it is simple for the UE to realize and the utilization ratio of resources is improved.

DETAILED DESCRIPTION OF THE INVENTION

The present invention will be described in detail with reference to the drawings.

A core of the present invention is that since the multi-carrier HSDPA has more channel resources for packet data transmission than the single carrier HSDPA, there are more factors to be taken into account when adopting the multi-carrier HSDPA to perform the packet data transmission.

Suppose that in the multi-carrier HSDPA application, channel resources for HSDPA transmission on all the carriers are bound into one HS-DSCH. When a UE accesses the network, the network allocates K pairs of uplink and downlink control channels to be monitored by the UE to perform the HSDPA service transmission. During the HSDPA service transmission process, the network selects N pairs from the K pairs of uplink and downlink control channels to perform the HSDPA data transmission control. The network may select a pair of uplink and downlink control channels for the UE and transmit the control information of the HS-DSCH on all the carriers through the pair of uplink and downlink control channels. At the same time, the network may transmit the control information for HSDPA transmission of the UE on each carrier through one pair of uplink and downlink control channels and establish a corresponding relation between the uplink and downlink control channels with the carrier. An initial power for the selected uplink and downlink control channels on the same carrier is set by using the uplink and downlink associate channels. In the multi-carrier HSDPA packet data transmission process, the UE may set the initial power and the synchronous information of the selected uplink and downlink control channels through the uplink and downlink associate channels, interact information with the network through the selected uplink and downlink control channels and receive the packet data from the network through the control information obtained by detecting the downlink control information so that the multi-carrier HSDPA packet data transmission is realized.

Figure 1:
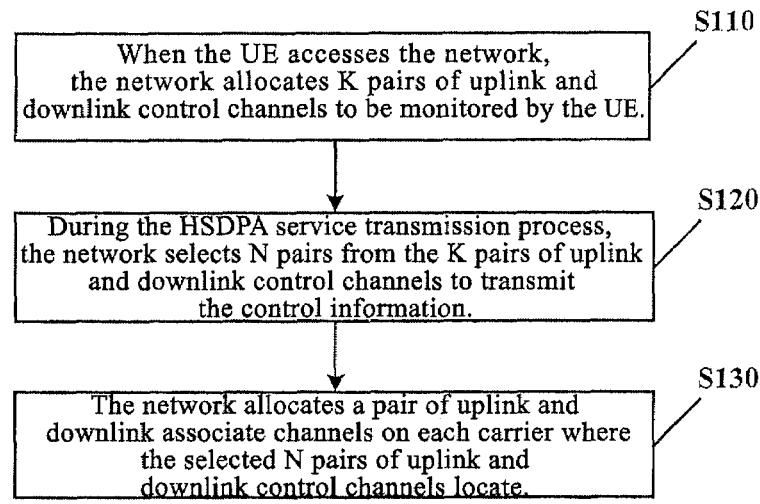
FIG. 1 is a flow chart showing a control channel allocation method of a multi-carrier HSDPA.

Refer to FIG. 1, which is a flow chart showing a control channel allocation method of a multi-carrier HSDPA and includes the following steps.

S110: When the UE accesses the network, the network allocates K pairs of uplink and downlink control channels to be monitored by the UE to perform the HSDPA service transmission. The network may allocate the K pairs of uplink and downlink control channels according to the specific channel resources. K is determined by the system and the network according to the resource status. The network may allocate the K pairs of uplink and downlink control channels of one UE to the same carrier according to the channel resources.

S120: During the HSDPA service transmission process, the network selects N pairs from the K pairs of uplink and downlink control channels to transmit the control information and the selected downlink control channel is on the same carrier as the corresponding uplink control channel.

S130. The network allocates a pair of uplink and downlink associate channels on each carrier where the selected N pairs of uplink and downlink control channels locate, wherein M≥N≥1 and M is a number of carriers used by the network to transmit packet data.

In order to simplify the packet data transmission of the UE, according to the present invention, all the HS-SCCHs and HS-SICHs of the same UE are selected to be on the same carrier. When all the selected HS-SCCHs and HS-SICHs of the same UE are on the same carrier, a pair of uplink and downlink associate channel may be allocated to the UE so as to improve the resource utilization ratio.

Two embodiments will be explained to illustrate the control channel allocation of the multi-carrier HSDPA.

Embodiment 1

When the UE accesses the network, the network allocates K pairs of uplink and downlink control channels to be monitored by the UE. During the HSDPA service transmission process, the network selects one pair from the K pairs of uplink and downlink control channels (HS-SCCH and HS-SICH) for the UE and this pair of uplink and downlink channels is for transmitting control messages on all the carriers for packet data transmission. The control message on the HS-SCCH includes number of carriers and corresponding frequency points, slot allocated to the UE by each carrier, code channel No., modulation method of the transmission data, size of the transmission block, redundancy version, retransmission ID and processing process of HAQR (Hybrid Automatic Repeat Request)) and ID of the UE. The UE can correctly receive the packet switching data from the network according to the control message transmitted through the downlink control channel. The control information on the HS-SICH includes the channel status information of each carrier for transmitting packet data sent from the UE to the network and the received packet data response message.

At the beginning of the UE accesses the network, the network usually allocates several pairs of HS-SCCH channel and HS-SICH channel to the same UE. The principle of selecting the HS-SCCH channel and HS-SICH channel is that they are on the same carrier. In addition, the uplink and downlink associate channels allocated to the UE are on the same channel. The advantage of multiple carriers sharing the same control channel is that the number of the HS-SCCH to be monitored is small and the realization of the UE is simple.

Embodiment 2

The corresponding relation between each carrier and the selected pair of the uplink control channel and the downlink control channel (HS-SCCH and HS-SICH) is established during the HSDPA service transmission process. The network transmits the control information for the HSDPA transmission on the pair of the uplink control channel and the downlink control channel corresponding to the carrier and sets the initial power for the uplink control channel and the downlink control channel on the same carrier by using the uplink and downlink associate channels. During the multi-carrier transmission, the network uses L carriers to perform the packet data transmission and L pairs of uplink and downlink control channels correspond to the L carriers, wherein each pair of uplink and downlink control channels transmits the control information about the HS-DSCH on one carrier. The UE monitors K (K>=L) HS-SCCHs and obtains necessary control information of the packet data. The necessary control information includes: frequency point of the carrier, slot allocated to the user by the carrier, code channel number, modulation mode of the transmission data, size of the transmission data block, redundancy version number, retransmission ID, processing process of the HAQR and ID of the UE. The corresponding HS-SICH transmits the uplink control information of the carrier and the control information includes the channel status of the carrier and the response message of receipt of the packet data.

All the selected HS-SCCHs of the UE can be on the same carrier and transmit the control information necessary for the packet data transmission on the carrier respectively. The selected HS-SCCHs of the UE can be on different carriers also. For example, the HS-SCCH on each carrier transmits the control information necessary for the packet data transmission on the carrier or several HS-SCCHs are on the same carrier and transmit the control information necessary for the packet data transmission on the carrier respectively.

In addition, preferably, K HS-SCCHs allocated to the UE are on the same carrier. However, in order to simplify the realization complexity of the UE and to improve the utilization ratio of the resources, generally, the HS-SICHs of the same user are allocated on the same carrier and the HS-SCCHs of the same user are allocated on the same carrier. When the channel resources are abundant, the HS-SICHs and the HS-SCCHs of the same user can be allocated on the same carrier and a pair of uplink and downlink associate channels for the UE can be allocated on the same carrier.

If all the selected HS-SCCHs and HS-SICHs of the UE are on the same carrier, only one pair of the associate DPCH is allocated to the UE; otherwise if the K pairs of the HS-SCCHs and HS-SICHs are allocated on the M carriers, M pairs of associate DPCHs are needed and each pair of uplink and downlink control channels correspond to one pair of carriers.

Each pair of the selected HS-SCCH and HS-SCCH controls the transmission information on each carrier, i.e. the HS-SCCH indicates information such as the channel resource allocated on the carrier by the HS-DSCH and the size of the transmission data block, the HS-SICH reports the channel status and the ACK response message. Suppose that Node B allocates three carriers A, B and C for the UE to transmit data in HS-DSCH channel and adopts three pairs of HS-SCCH and HS-DSCH control channels to transmit the corresponding control information, wherein each pair of control channels control the transmission data format of the HS-DSCH on one carrier resource.

According to the $2^{nd}$ embodiment, the allocation of the multi-carrier HSDPA control channel is performed and the allocation is more flexible and is convenient for the network to configure resources.

Figure 2:
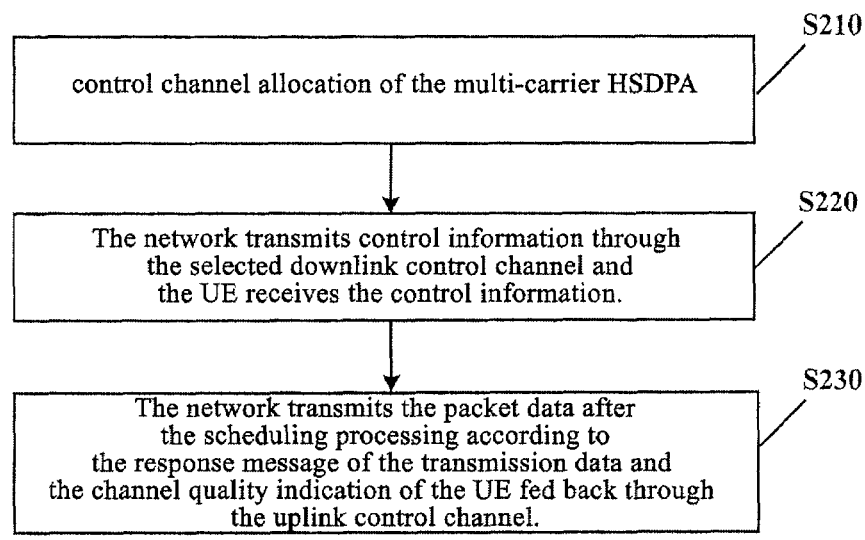
FIG. 2 shows a packet data transmission method of the multi-carrier HSDPA.

Based on the above control channel allocation of the multi-carrier HSDPA, a multi-carrier HSDPA packet data transmission method is provided. FIG. 2 is a flow chart of the packet data transmission method of the multi-carrier HSDPA.

S210: control channel allocation of the multi-carrier HSDPA

Step A. When the UE accesses the network, the network allocates K pairs of uplink and downlink control channels to be monitored by the UE;

Step B. During the HSDPA service transmission process, the network selects N pairs from the K pairs of uplink and downlink control channels to transmit control messages, wherein the selected downlink channels and the corresponding uplink channels are on the same carrier;

Step C. The network allocates a pair of uplink and downlink associate channels on each carrier where the selected N pairs of uplink and downlink control channels locate, wherein M≥N≥1 and M is a number of carriers used by the network to transmit packet data.

Actually, the uplink and downlink control channels are common channels and the uplink and downlink associate channels are the dedicated channels. The uplink and downlink associate channels are for transmitting the high layer control signaling, high layer response message of the UE and the power control and synchronous control messages initiating the HS-SCCH and the HS-SICH. The UE obtains the high layer control signaling transmitted from the network and the power and synchronous control data of the uplink and downlink control channels through the uplink and downlink control channels so that the UE can correctly set the initial power of the selected uplink and downlink control channels and to perform the synchronous control and the UE may communicate with the network through the selected uplink and downlink control channels. The network may notify the UE about the information on the data block transmitted to the UE on the HS-DSCH, including adopted slot, channel, modulation mode, size of the data block, redundancy version NO., retransmission ID etc. The UE may feed the response message of the transmission data and the channel status of the UE to the network.

S220: The network transmits control information needed for the UE to receive the packet data through the selected downlink control channel so that the UE may receive the control information. The UE detects the HS-SCCH allocated in S210 at realtime and when it detects the information, after demodulation, decoding under the preset format and CRC check, it obtains the control information needed to transmit the packet data.

S230: The network transmits the packet data after the scheduling processing according to the response message of the transmission data and the channel quality indication of the UE fed back through the uplink control channel.

The network transmits the packet data through the HS-DSCH. When there is an error in the data received by the UE and the number of the retransmission times hasn't exceeded the maximum number, the UE will notify the network to retransmit the data; if there is an error in the data received by the UE and the number of the retransmission times has exceeded the maximum number, the UE will abandon the data and the network will transmit new data; if there is no error, the network will transmit new data. The response message of the transmission data and the channel quality indication message of the UE may be transmitted through the HS-SICH so that the network can receive the response message of the transmission data and the channel quality indication message of the UE fed back through the HS-SICH and determine the next action, i.e. to retransmit data or to transmit new data.

According to the above steps of the present invention, the packet data transmission of the multi-carrier HSDPA can be realized. Two examples will be given to illustrate the packet data transmission.

Example 1

Suppose that the UE of user A supports to receive the HSDPA data on N carriers, the network selects channel resources of M carriers from the N carriers supported by the UE (M≤N). The channel resources include carrier, slot and code channel. The network allocates K pairs of HS-SCCH and HS-SICH for the UE, wherein each pair of the HS-SCCH and the HS-SICH is on the same carrier.

When the UE of user A has no data to transmit, it monitors the K HS-SCCH. If the network needs to transmit data to the UE of user A on the HS-DSCH, the network will select one from the K HS-SCCH as a control channel of the HS-DSCH and transmits all the control information related with the HS-DSCH and allocates a pair of uplink and downlink associate channels on the carrier.

Suppose Node B transmits data to the UE of user A with L carriers, the HS-SCCH transmits the control information of the HS-DSCH on the L carriers to the UE of user A, such as the number of carriers and the corresponding frequency points, slot allocated to the UE by each carrier, code channel No., modulation method of the transmission data, size of the transmission block, redundancy version, retransmission ID and processing process of HAQR and ID of the UE, i.e. the downlink control information of the multiple carriers is transmitted through the control channel. At the same time, the UE of user A transmits the channel status information and the response message of receipt of the L carriers to Node B through the HS-SICH corresponding to the HS-SCCH and the network decides whether to retransmit according to the response message of receipt reported by the UE. If new data are to be transmitted, the network decides the object to be served next time and the transmission format according to the channel status information.

By the method according to which multiple carriers share a pair of control channels to perform the data transmission, each UE only needs to monitor one HS-SCCH so the realization is simple.

Example 2

Suppose that the UE of user A supports to receive the HSDPA data on N carriers, the network selects channel resources of M carriers from the N carriers supported by the UE (M≤N). The network allocates K pairs of HS-SCCH and HS-SICH for the UE, wherein each pair of the HS-SCCH and the HS-SICH is on the same carrier.

When the UE of user A has no data to transmit, it monitors the K HS-SCCH. If Node B at the network selects the HS-DSCHs of the L (1≤L≤M) carriers to transmit data to the UE of user A, Node B selects L pairs from the K pairs of HS-SCCHs and HS-SICHs as the control channels, wherein each carrier corresponds to a pair of control channels. On the HS-SCCH corresponding to each carrier, Node B transmits the downlink control information of the HS-DSCH resource of the carrier. Similarly, the uplink control information of the carrier is transmitted on the corresponding HS-SICH, wherein the control information includes the channel status of the carrier and the response message of receipt of the transmission data.

If all the HS-SCCHs and HS-SICHs of the user are on the same carrier, only one pair of associate DPCHs is allocated to the user; otherwise, if the K pairs of control channels are allocated on the M carriers, M pairs of associate DPCHs are to be allocated wherein each pair of associate DPCHs corresponds to a pair of carriers.

Each pair of HS-SCCH and HS-SICH controls the transmission information on one carrier, i.e. the HS-SCCH indicates information such as the channel resource allocated by the HS-DSCH on the carrier and the size of the transmission data block, and the HS-SICH reports the channel status and ACK response information.

According to the data transmission method wherein each carrier corresponds to one control channel, the network may perform a more flexible allocation and it is convenient for the resource configuration.

A radio network controller (RNC) is provided and it is used for allocating control channels for a multi-carrier HSDPA, wherein the RNC includes a control channel allocation apparatus, including an uplink and downlink control channel allocation unit, an uplink and downlink control channel selection unit and an uplink and downlink associate channel allocation unit, wherein:

the uplink and downlink control channel allocation unit is for allocating K pairs of uplink and downlink control channels for a UE accessed a network;

the uplink and downlink control channel selection unit is for selecting N pairs from the K pairs of uplink and downlink control channels to transmit control messages during a HSDPA service transmission process;

the uplink and downlink associate channel allocation unit is for allocating a pair of uplink and downlink associate channels on each carrier.

The control channel allocation unit of the RNC can be realized by the controller in the RNC. The allocation of control channels in each cell is generally uniform. For example, a pair of uplink and downlink control channels is allocated to the user accessed in the cell. The control channel allocation unit can be connected with the transceiver and when there is a UE accesses the network, the uplink and downlink control channel allocation unit allocates the uplink and downlink control channels for the UE. The uplink and downlink control channel selection unit is connected with the uplink and downlink control channel allocation unit and is for selecting N pairs from the K pairs of uplink and downlink control channels allocated to the UE to transmit control information during the HSDPA service transmission process. The uplink and downlink associate channel allocation unit allocates the uplink and downlink associate channels corresponding to the carrier where the selected uplink and downlink control channels locate. Each pair of uplink and downlink control channels is on the same carrier and a pair of uplink and downlink associate channels is allocated on the carrier where the pair of uplink and downlink control channel locates.

The above descriptions are only preferred embodiments of the present invention and will not limit the scope of the invention. Those skilled in the art may make variable changes without departing from the protection scope of the present invention.

The invention claimed is:

1. A method for allocating control channels for multi-carrier high speed downlink packet access (HSDPA), comprising:

step A, when a user equipment (UE) accesses a network, the network allocating to the UE with K pairs of uplink and downlink control channels to be monitored by the UE;

step B, during a HSDPA service transmission process, the network selecting N pairs from the K pairs of uplink and downlink control channels to transmit control messages, wherein the selected downlink channels and the corresponding uplink channels are on a same carrier; and step C, the network allocating a pair of uplink and downlink associate channels to each carrier where the selected N pairs of uplink and downlink control channels locate, wherein M≥N≥1 and M is a number of carriers used by the network to transmit packet data, wherein:

the uplink and downlink control channels are common channels, the uplink and downlink associate channels are dedicated channels, and the uplink and downlink associate channels are for transmitting high layer control signaling, high layer response messages of the UE and power control and synchronous control messages initiating the uplink and downlink control channels.

2. The method according to claim 1, wherein the uplink control channel is used for the UE to transmit a channel condition on a corresponding carrier and a response message of receipt, the downlink control channel corresponding to the uplink control channel is used for transmitting a downlink control message about a high speed data sharing channel (HS-DSCH) resources on a corresponding carrier.

3. The method according to claim 1, wherein in step B, the N pairs of uplink and downlink control channels correspond one-by-one to the carriers used by the network to transmit data, and each pair of uplink and downlink control channels are used for transmitting control messages of a high speed data sharing channel (HS-DSCH) on the corresponding carrier.

4. The method according to claim 3, wherein in step B, the N pairs of uplink and downlink control channels are on the same carrier; while in step C, the network allocates a pair of uplink and downlink associate channels on the carrier where the N pairs of uplink and downlink control channels locate.

5. The method according to claim 1, wherein in step B, N is equal to 1 and in this case the pair of uplink and downlink control channels is used for transmitting control messages of a high speed data sharing channel (HS-DSCH) on all the carriers.

6. The method according to claim 1, wherein in step A, the K pairs of uplink and downlink control channels are on a same carrier.

7. A method for transmitting packet data for multi-carrier high speed downlink packet access (HSDPA), comprising:

step A, when a user equipment (UE) accesses a network, the network allocating to the UE with K pairs of uplink and downlink control channels to be monitored by the UE;

step B, during a HSDPA service transmission process, the network selecting N pairs from the K pairs of uplink and downlink control channels to transmit control messages, wherein the selected downlink channels and the corresponding uplink channels are on a same carrier;

step C, the network allocating a pair of uplink and downlink associate channels to each carrier where the selected N pairs of uplink and downlink control channels locate, wherein M≥N≥1 and M is a number of carriers used by the network to transmit packet data;

step D, the network transmitting a control message enabling the UE to receive packet data through the downlink control channel and the UE obtaining the control message through the downlink control channel; and step E, the network scheduling and transmitting packet data according to a response message of transmitting data and a channel quality indication of the UE fed back through the uplink control channel, wherein:

the uplink and downlink control channels are common channels, the uplink and downlink associate channels are dedicated channels, and the uplink and downlink associate channels are for transmitting high layer control signaling, high layer response messages of the UE and power control and synchronous control messages initiating the uplink and downlink control channels.

8. The method according to claim 7, wherein between step C and step D, the UE sets an initial power for the selected uplink and downlink control channels through the information of the uplink and downlink associate channels.

9. The method according to claim 7, wherein in step B, the N pairs of uplink and downlink control channels correspond one-by-one to the carriers used by the network to transmit data, and each pair of uplink and downlink control channels are used for transmitting control messages of a high speed data sharing channel (HS-DSCH) on the corresponding carrier.

10. The method according to claim 9, wherein in step B, the N pairs of uplink and downlink control channels are on a same carrier; while in step C, the network allocates a pair of uplink and downlink associate channels on the carrier where the N pairs of uplink and downlink control channels locate.

11. The method according to claim 7, wherein in step B, N is equal to 1 and in this case the pair of uplink and downlink control channels is used for transmitting control messages of a high speed data sharing channel (HS-DSCH) on all the carriers.

12. The method according to claim 7, wherein in step A, the K pairs of uplink and downlink control channels are on a same carrier.

13. A radio network controller (RNC), for allocating control channels for multi-carrier high speed downlink packet access (HSDPA), wherein the RNC includes a control channel allocation apparatus, the control channel allocation apparatus including an uplink and downlink control channel allocation unit, an uplink and downlink control channel selection unit and an uplink and downlink associate channel allocation unit, wherein the uplink and downlink control channel allocation unit is configured for allocating K pairs of uplink and downlink control channels for a user equipment (UE) accessed the network;

the uplink and downlink control channel selection unit is configured for selecting N pairs from the K pairs of uplink and downlink control channels to transmit control messages during a HSDPA service transmission process, wherein $M \geq N \geq 1$ and M is a number of carriers used by the network to transmit packet data; and the uplink and downlink associate channel allocation unit is configured for allocating a pair of uplink and downlink associate channels on each carrier, wherein:

the uplink and downlink control channels are common channels, the uplink and downlink associate channels are dedicated channels, and the uplink and downlink associate channels are for transmitting high layer control signaling, high layer response messages of the UE and power control and synchronous control messages initiating the uplink and downlink control channels.

* * * * *